(12) United States Patent
Oguri

(10) Patent No.: US 9,944,185 B2
(45) Date of Patent: Apr. 17, 2018

(54) VEHICLE CONTROL DEVICE

(71) Applicant: Toyota Jidosha Kabushiki Kaisha, Toyota-shi (JP)

(72) Inventor: Haruki Oguri, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/180,435

(22) Filed: Jun. 13, 2016

(65) Prior Publication Data

US 2017/0015203 A1 Jan. 19, 2017

(30) Foreign Application Priority Data

Jul. 15, 2015 (JP) ................................. 2015-141467

(51) Int. Cl.
*B60L 7/18* (2006.01)
*B60L 15/20* (2006.01)
(Continued)

(52) U.S. Cl.
CPC ............... *B60L 7/18* (2013.01); *B60L 3/0015* (2013.01); *B60L 11/126* (2013.01); *B60L 11/14* (2013.01); *B60L 15/2009* (2013.01); *B60T 1/10* (2013.01); *B60T 7/12* (2013.01); *B60T 8/171* (2013.01); *B60T 13/586* (2013.01); *F16D 61/00* (2013.01); *B60L 2240/12* (2013.01); *B60L 2240/423* (2013.01); *B60L 2250/28* (2013.01); *B60T 2201/022* (2013.01); *B60T 2270/604* (2013.01); *B60Y 2200/92* (2013.01);
(Continued)

(58) Field of Classification Search
None
See application file for complete search history.

(56) References Cited

U.S. PATENT DOCUMENTS

2013/0211688 A1 8/2013 Oguri et al.
2013/0226380 A1 8/2013 Ando et al.
(Continued)

FOREIGN PATENT DOCUMENTS

JP 2013-177026 9/2013
JP 2015-16810 1/2015
(Continued)

*Primary Examiner* — Rodney A Butler
*Assistant Examiner* — Tamara L Weber
(74) *Attorney, Agent, or Firm* — Oblon, McClelland, Maier & Neustadt, L.L.P.

(57) ABSTRACT

Appropriate collision avoidance support control is enabled in a vehicle configured to carry out regeneration enhancement control. A predictive deceleration support control unit is configured to set a position at which the vehicle is predicted to finish deceleration as a target deceleration end position, and guide a driver to release an accelerator pedal so that the deceleration of the vehicle is finished at the target deceleration end position, to thereby carry out regeneration enhancement control under a state in which the accelerator pedal is released so as to generate a larger deceleration than in a normal state. The predictive deceleration support control unit is configured to read a collision avoidance support control flag from a collision avoidance support ECU, and stop the regeneration enhancement control when the collision avoidance support control is being carried out.

2 Claims, 9 Drawing Sheets

(51) Int. Cl.

| | | |
|---|---|---|
| *B60T 7/12* | (2006.01) | |
| *B60T 8/171* | (2006.01) | |
| *B60T 1/10* | (2006.01) | |
| *B60T 13/58* | (2006.01) | |
| *F16D 61/00* | (2006.01) | |
| *B60L 3/00* | (2006.01) | |
| *B60L 11/12* | (2006.01) | |
| *B60L 11/14* | (2006.01) | |

(52) U.S. Cl.
CPC .......... *Y02T 10/6217* (2013.01); *Y02T 10/645* (2013.01); *Y02T 10/7005* (2013.01); *Y02T 10/7077* (2013.01); *Y02T 10/72* (2013.01); *Y02T 10/7275* (2013.01)

(56) References Cited

U.S. PATENT DOCUMENTS

| | | | |
|---|---|---|---|
| 2014/0142797 A1* | 5/2014 | Otake | B60W 20/00 |
| | | | 701/22 |
| 2015/0019057 A1 | 1/2015 | Morisaki et al. | |
| 2015/0019097 A1 | 1/2015 | Morisaki et al. | |
| 2016/0052495 A1* | 2/2016 | Nakaso | B60T 7/22 |
| | | | 701/70 |
| 2016/0347181 A1* | 12/2016 | Yamakado | B60L 3/0015 |
| 2016/0375775 A1* | 12/2016 | Imanishi | B60T 1/10 |
| | | | 701/70 |

FOREIGN PATENT DOCUMENTS

| | | |
|---|---|---|
| JP | 2015-19521 | 1/2015 |
| WO | WO 2012/053106 A1 | 4/2012 |

\* cited by examiner

VEHICLE CONTROL DEVICE

BACKGROUND OF THE INVENTION

1. Field of the Invention

The present invention relates to a vehicle control device, which is configured to support an operation of a driver so as to increase an electric power regeneration amount in a vehicle capable of generating a braking force by recovering electric power to an in-vehicle battery.

2. Description of the Related Art

For example, as proposed in International Patent WO2012/053106A1, there is known a drive support device, which is configured to set a target stop position for a vehicle and to issue an instruction to release an accelerator pedal so that the vehicle stops at the target stop position. Moreover, as proposed in Japanese Patent Application Laid-open No. 2015-19521, there is known a vehicle including a regenerative generator, which is configured to set such a deceleration start position as to increase an electric power regeneration amount to be recovered to a battery during deceleration travel up to a target stop position and to decelerate the vehicle at a high deceleration so that a driver can carry out an ecological drive.

There is an upper limit for a charge current that can be supplied to a battery, and hence, on the vehicle including the regenerative generator, a braking force that can be generated by the electric power regeneration is also limited. Upon an emergency braking operation, a required braking force temporarily exceeds the braking force that can be generated by the electric power regeneration, and hence an insufficient amount in the braking force is compensated by a hydraulic friction braking. Thus, a rotational energy of the wheels cannot be used effectively. Therefore, for the ecological drive, it is important not to carry out the emergency braking operation.

In the vehicle proposed in Japanese Patent Application Laid-open No. 2015-19521, when the vehicle approaches the target stop position, the vehicle speed has already substantially decreased, and hence the driver does not need to depress a brake pedal hard before the target stop position. Thus, the emergency braking operation by the driver can be suppressed, and the power can thus be efficiently recovered to the battery, resulting in an increase in fuel consumption performance. The control of increasing the deceleration when the vehicle is decelerating up to the target stop position (increasing the regenerative braking force), thereby increasing the regenerative electric energy in this way, is referred to as regeneration enhancement control.

Incidentally, there is known a vehicle in which a collision avoidance support device is installed. When an obstacle highly likely to collide with the own vehicle is detected by a sensor, e.g., a radar, the collision avoidance support device increases a brake hydraulic pressure generated when the driver depresses a brake pedal as compared to that in a normal state, to thereby generate a large braking force, or automatically generates the brake hydraulic pressure when the driver does not depress the brake pedal. This control of generating the braking force through the brake hydraulic pressure control to support the collision avoidance for the vehicle is referred to as collision avoidance support control.

A case is conceivable in which the regeneration enhancement control and the collision avoidance support control are simultaneously being carried out, and then, the regeneration enhancement control is finished earlier. In this case, the following problem may arise.

The regeneration enhancement control is finished when the own vehicle reaches a target stop position. Moreover, the target stop position is merely a position at which the vehicle is predicted to stop. Therefore, contrary to the prediction, the own vehicle may not stop at the target stop position and continue traveling. For example, a case is considered in which, under a state in which both the regeneration enhancement control and the collision avoidance support control are simultaneously being carried out, the own vehicle does not stop at the target stop position and continues traveling. In this case, the regeneration enhancement control is finished when the own vehicle passes the target stop position during the execution of the collision avoidance support control, and a regenerative braking force that has been applied until the end of the regeneration enhancement control suddenly disappears, resulting in a rapid decrease in the braking force. The collision avoidance support device carries out the collision avoidance support control based on an inter-vehicle distance between the own vehicle and a preceding vehicle (obstacle), a relative speed between the own vehicle and the preceding vehicle, and the like, and thus an unexpected decrease in the deceleration of the own vehicle may adversely affect a determination precision for the collision with the preceding vehicle and the like. Therefore, the execution of the regeneration enhancement control may induce deterioration in performance of the collision avoidance support control.

SUMMARY OF THE INVENTION

The present invention has been made in view of the above-mentioned problem, and therefore has an object to enable appropriate collision avoidance support control in a vehicle configured to carry out regeneration enhancement control.

In order to achieve the above-mentioned object, a feature of one embodiment of the present invention resides in a vehicle control device, which is to be applied to a vehicle, the vehicle including:
- a regenerative braking device (11, 12, 13, 51, 53) configured to generate electric power by a wheel rotated by an external force and to recover the generated electric power to an in-vehicle battery, to thereby apply a regenerative braking force to the wheel; and
- a friction braking device (40, 45, 60) configured to apply a friction braking force to the wheel through a brake hydraulic pressure, the vehicle control device including:
- position setting means (71) configured to set, when the vehicle is predicted to decelerate based on position information of the vehicle, a position at which the deceleration is predicted to be finished as a target deceleration end position;
- regeneration enhancement control means (72, S16, S17, S19) configured to carry out regeneration enhancement control, which is control of using the regenerative braking device to decelerate the vehicle so that electric energy recovered to the in-vehicle battery when an accelerator pedal is released increases during deceleration of the vehicle to which the target deceleration end position is set as compared to deceleration of the vehicle to which the target deceleration end position is not set, and finishing the regeneration enhancement control when the vehicle reaches the target deceleration end position;

obstacle state detection means (91) configured to detect that the vehicle is in a state in which the vehicle is highly likely to collide with an obstacle;

collision avoidance support means (90) configured to carry out collision avoidance support control of controlling the brake hydraulic pressure when the state in which the vehicle is highly likely to collide with an obstacle is detected, to thereby support avoidance of the collision between the vehicle and the obstacle; and prioritization means (73, S21 to S24) configured to prioritize the collision avoidance support control by the collision avoidance support means over the regeneration enhancement control by the regeneration enhancement control means so that the collision avoidance support control and the regeneration enhancement control are not simultaneously carried out.

The vehicle control device according to the one embodiment of the present invention is applied to the vehicle including the regenerative braking device configured to generate the electric power by the wheel rotated by the external force and to recover the generated electric power to the in-vehicle battery, to thereby apply the regenerative braking force to the wheel, and the friction braking device configured to apply the friction braking force to the wheel through the brake hydraulic pressure. The vehicle control device includes the position setting means and the regeneration enhancement control means as means for supporting the driver so as to carry out the ecological drive.

The position setting means is configured to set, when the vehicle is predicted to decelerate based on the position information of the vehicle, the position at which the deceleration is predicted to be finished as the target deceleration end position. The position at which the deceleration is finished is a position at which the brake pedal is released, for example, a stop position of the vehicle (namely, a start position). For example, for deceleration before a curved road, the position is a position of the vehicle at which the deceleration is finished and the brake pedal is released. For example, the position setting means may be configured to sample a vehicle position (own vehicle position) acquired when the brake pedal is released, and to set a vehicle position at which a frequency of the release of the brake pedal is higher than a threshold as the target deceleration end position. Further, for example, the position setting means may be configured to acquire information of a traffic light existing in a travel direction of the vehicle, and, when the driver is predicted to stop the vehicle due to display of the traffic light, set a stop line of an intersection at which the traffic light exists as the target deceleration end position. In addition, for example, the position setting means may be configured to acquire information of temporary stop positions from a navigation device, and set a temporary stop position existing in the travel direction of the vehicle as the target deceleration end position. The position setting means may also be configured to set only a position at which the vehicle is predicted to stop as the target deceleration end position, that is, to exclude a position at which the vehicle is predicted to stop deceleration but does not stop from the target deceleration end position.

The regeneration enhancement control means is configured to carry out the regeneration enhancement control, which is the control of using the regenerative braking device to decelerate the vehicle so that the electric energy recovered to the in-vehicle battery when the accelerator pedal is released increases during the deceleration of the vehicle to which the target deceleration end position is set as compared to the deceleration of the vehicle to which the target deceleration end position is not set (referred to as normal state). As a result, when the target deceleration end position is set, as compared to the normal state, the deceleration of the vehicle increases, and the electric energy recovered to the in-vehicle battery increases. Moreover, the driver operates the brake pedal on a stage on which the vehicle has considerably decelerated, and a braking operation amount thus decreases. As a result, the driver can be prevented from carrying out the emergency braking operation. Thus, the driver can be supported to carry out the ecological drive.

The vehicle control device according to the one embodiment of the present invention includes the obstacle state detection means and the collision avoidance support means as means for supporting the avoidance of the collision of the vehicle with the obstacle. The obstacle state detection means is configured to detect that the vehicle (own vehicle) is in the state in which the vehicle is highly likely to collide with the obstacle. The collision avoidance support means is configured to carry out the collision avoidance support control of controlling the brake hydraulic pressure when the state in which the vehicle is highly likely to collide with the obstacle is detected, to thereby support the avoidance of the collision between the vehicle and the obstacle.

A case is conceivable in which the regeneration enhancement control and the collision avoidance support control are simultaneously being carried out, and then, the regeneration enhancement control is finished earlier. In this case, when the regeneration enhancement control is finished, the regenerative braking force applied until the end of the regeneration enhancement control suddenly disappears, and the deceleration of the vehicle rapidly decreases accordingly. Therefore, the deterioration in performance of the collision avoidance support control may be induced.

Thus, the vehicle control device according to the one embodiment of the present invention includes the prioritization means. The prioritization means is configured to prioritize the collision avoidance support control by the collision avoidance support means over the regeneration enhancement control by the regeneration enhancement control means so that the collision avoidance support control and the regeneration enhancement control are not simultaneously carried out.

In this case, the prioritization means may be configured to inhibit the regeneration enhancement control means from starting the regeneration enhancement control when the collision avoidance support control is being carried out, and to cause the regeneration enhancement control means to finish the regeneration enhancement control when the collision avoidance support control is started while the regeneration enhancement control is being carried out. With this, the regeneration enhancement control does not adversely affect the collision avoidance support control, and thus the collision avoidance support control can be appropriately carried out.

Further, a feature of one aspect of the present invention resides in that the vehicle control device further includes:

accelerator release guidance means (S11 to S13) configured to give a notification for prompting a driver to release the accelerator pedal so that the deceleration of the vehicle finishes at the target deceleration end position; and guidance inhibition means (73, S21, S22, S24) configured to inhibit the accelerator release guidance means from giving the notification for prompting the driver to release the accelerator pedal when the collision avoidance support control is being carried out.

The accelerator release guidance means is configured to give the notification for prompting the driver to release the accelerator pedal so that the deceleration of the vehicle finishes at the target deceleration end position. In other words, a release timing for the accelerator pedal is notified to the driver. When the driver follows the guidance by the accelerator release guidance means to release the accelerator pedal, the regeneration enhancement control is carried out. Thus, the ecological drive by the driver is more appropriately supported.

Incidentally, when the vehicle is highly likely to collide with an obstacle, it is necessary to cause the driver to operate the brake pedal as soon as possible. For example, when the vehicle is highly likely to collide with an obstacle, the collision avoidance support means controls the brake hydraulic pressure and, in addition, activates a notification device configured to prompt the driver to operate the brake pedal. In this case, the release guidance for the accelerator pedal is not necessary, and may rather be obstructive. Thus, according to the one aspect of the present invention, when the collision avoidance support control is being carried out, the guidance inhibition means inhibits the accelerator release guidance means from giving the notification for prompting the driver to release the accelerator pedal. As a result, the collision avoidance support can be appropriately carried out.

In the above description, a reference numeral used in an embodiment of the present invention is enclosed in parentheses and is assigned to each of the constituent features of the invention corresponding to the embodiment in order to facilitate understanding of the invention. However, each of the constituent features of the invention is not limited to the embodiment defined by the reference numeral.

DETAILED DESCRIPTION OF THE PREFERRED EMBODIMENTS

Figure 1:
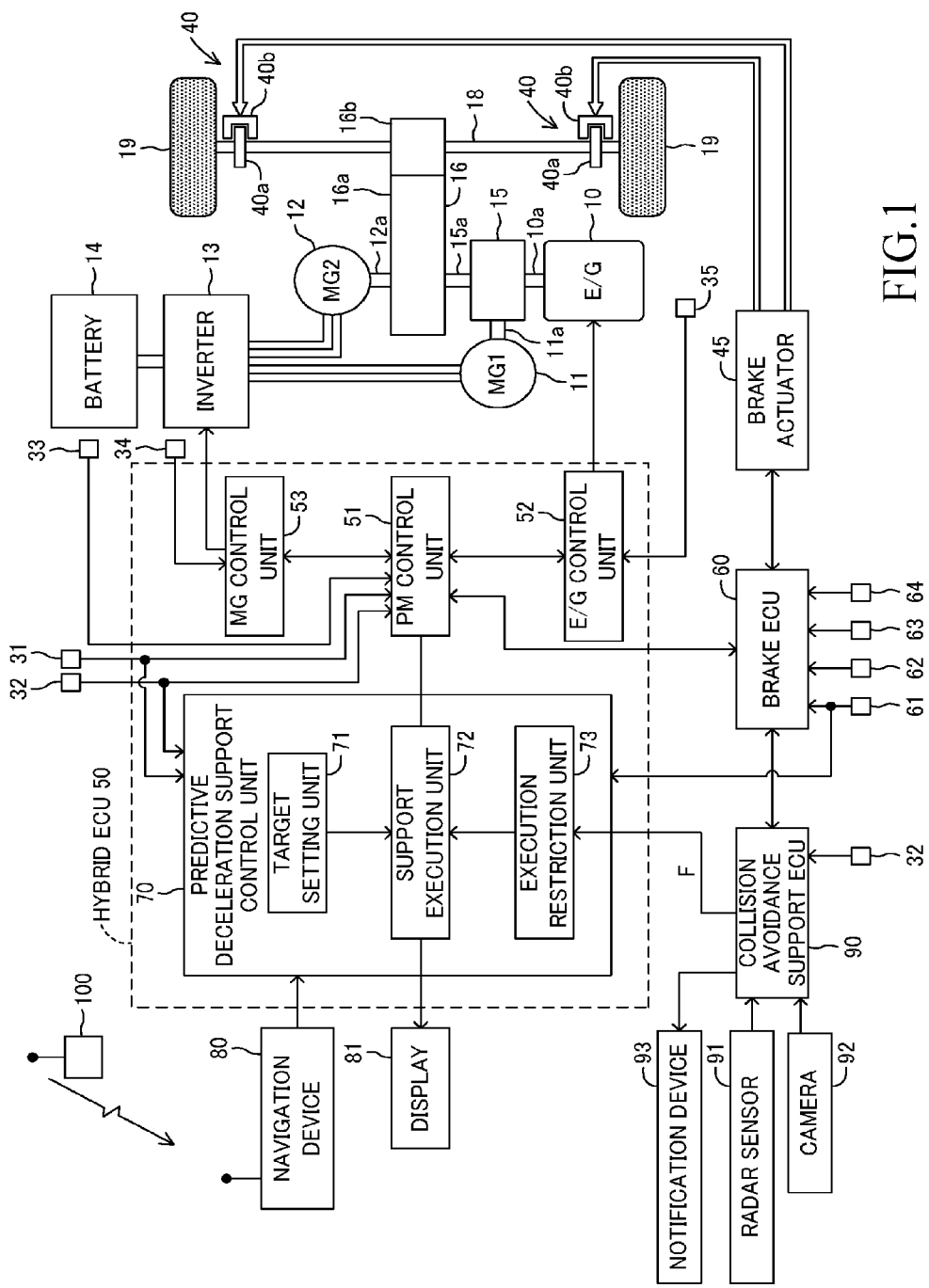
FIG. 1 is a schematic system configuration diagram for illustrating a vehicle control device according to an embodiment of the present invention.

Referring to the accompanying drawings, an embodiment of the present invention is described in detail below. FIG. 1 is a schematic system configuration diagram for illustrating a vehicle control device according to an embodiment of the present invention.

A vehicle on which the vehicle control device according to this embodiment is installed is a hybrid vehicle. This vehicle includes an engine 10, a first motor generator 11 (referred to as first MG 11), a second motor generator 12 (referred to as second MG 12), an inverter 13, a battery 14, a power distribution mechanism 15, a driving force transmission mechanism 16, and a hybrid electronic control unit 50 (referred to as hybrid ECU 50) as a travel drive device.

The engine 10 is a gasoline engine or a diesel engine.

The power distribution mechanism 15 is configured to distribute a driving force of the engine 10 to power for driving an output shaft 15a of the power distribution mechanism 15 and power for driving the first MG 11 as an electric power generator. The power distribution mechanism 15 is constructed by a planetary gear mechanism (not shown). The planetary gear mechanism includes a sun gear, pinion gears, a planetary carrier, and a ring gear (which are not shown). A rotational shaft of the planetary carrier is connected to a drive shaft 10a of the engine 10, and is configured to transmit the power to the sun gear and the ring gear via the pinion gears. A rotational shaft of the sun gear is connected to a rotational shaft 11a of the first MG 11, and the power transmitted from the sun gear is used for electric power generation by the first MG 11. A rotational shaft of the ring gear is connected to the output shaft 15a of the power distribution mechanism 15.

The output shaft 15a of the power distribution mechanism 15 and the rotational shaft 12a of the second MG 12 are connected to the driving force transmission mechanism 16. The driving force transmission mechanism 16 includes a speed reduction gear train 16a and a differential gear 16b, and is connected to wheel drive shafts 18. Thus, a torque from the output shaft 15a of the power distribution mechanism 15 and a torque from the rotational shaft 12a of the second MG 12 are transmitted to left and right drive wheels 19 via the driving force transmission mechanism 16. In FIG. 1, only the two wheels (drive wheels) out of the front/rear left/right wheels are illustrated. However, the drive wheels 19 may be any ones of the front wheels and the rear wheels, or may be the front and rear wheels.

The power distribution mechanism 15 and the driving force transmission mechanism 16 are well known, and configurations and operations thereof are described, for example, in Japanese Patent Application Laid-open No. 2013-177026 and the like, and those well-known technologies can be applied.

The first MG 11 and the second MG 12 are respectively permanent magnet type synchronous motors, and are connected to the inverter 13. The inverter 13 includes a first inverter circuit configured to drive the first MG 11 and a second inverter circuit configured to drive the second MG 12. The inverter 13 is configured to, when the first MG 11 or the second MG 12 is operated as a motor, convert DC power supplied from the battery 14 into three-phase AC, and supply the converted AC power to the first MG 11 or the second MG 12.

Moreover, each of the first MG 11 and the second MG 12 is configured to generate electric power when the rotational shaft is rotated by an external force. The inverter 13 is configured to, when the first MG 11 or the second MG 12 is operated as an electric power generator, convert generated three-phase electric power output from the first MG 11 or the second MG 12 into DC electric power, and use the converted DC electric power to charge the battery 14. By the charge (power recovery) to the battery 14, regenerative braking forces can be generated in the drive wheels 19.

The engine 10 and the inverter 13 are controlled by the hybrid ECU 50. The hybrid ECU 50 includes a power management control unit 51 (referred to as PM control unit 51), an engine control unit 52, and a motor/generator control unit 53 (referred to as MG control unit 53). Each of the control units 51, 52, and 53 includes a microcomputer as a main component. The PM control unit 51 is connected to each of the engine control unit 52 and the MG control unit 53 so as to be able to carry out mutual transmission/reception. The PM control unit 51 is connected to an accelerator sensor 31 configured to detect an accelerator operation amount AP, a vehicle speed sensor 32 configured to detect a vehicle speed Vx, and an SOC sensor 33 configured to detect a state of charge (SOC) of the battery 14. Moreover, the PM control unit 51 is configured to acquire information of rotational speeds of the first MG 11 and the second MG 12 via the MG control unit 53.

Figure 2:
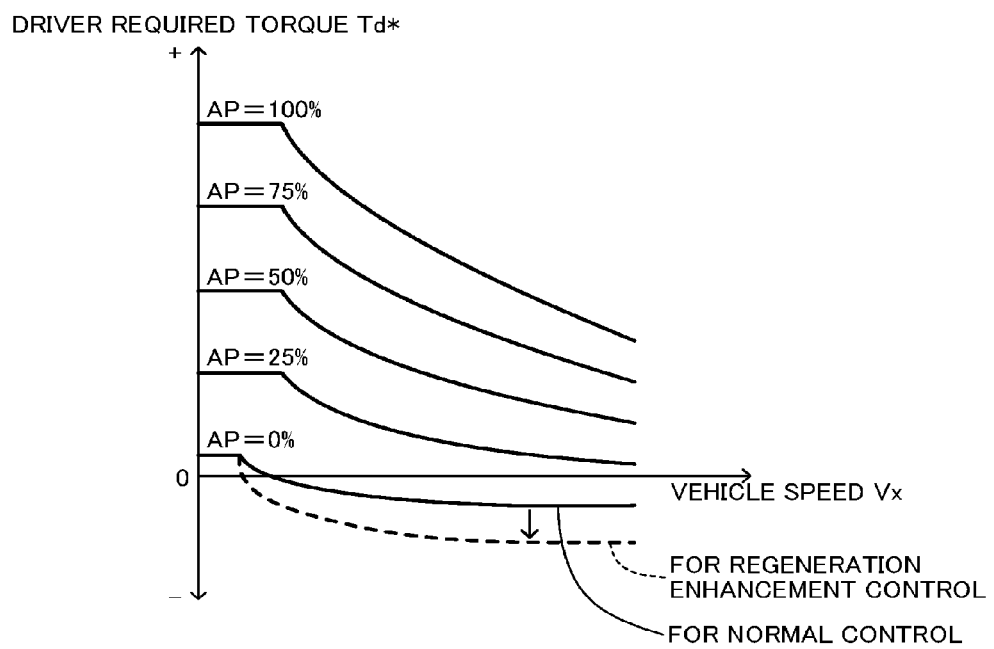
FIG. 2 is a graph for showing a driver required torque map.

The PM control unit 51 is configured to refer to a driver required torque map shown in FIG. 2 based on the accelerator operation amount AP (accelerator opening degree [%]) and the vehicle speed Vx to calculate a driver required torque Td* required for the travel. The driver required torque Td* is a torque required for the travel of the vehicle, and is a torque required for the wheel drive shafts 18. When the driver required torque Td* is negative, a braking torque for braking the vehicle is required.

The PM control unit 51 is configured to calculate an engine required driving torque, a first MG required torque, and a second MG required torque in accordance with a predetermined rule based on this driver required torque Td*, an SOC value of the battery 14, the rotational speeds of the first MG 11 and the second MG 12, and the like. Calculation methods for those required values are also well known, and are described, for example, in Japanese Patent Application Laid-open No. 2013-177026 and the like, and those well-known technologies can be applied.

The PM control unit 51 is configured to transmit the first MG required torque and the second MG required torque to the MG control unit 53. To the MG control unit 53, various sensors (such as rotational angle sensors configured to detect the rotational angles of the first MG 11 and the second MG 12, a voltage sensor, and a current sensor, which are referred to as MG control sensors 34) for controlling the first MG 11 and the second MG 12 are connected. The MG control unit 53 is configured to control the inverter 13 based on the first MG required torque and the second MG required torque. As a result, the first MG required torque is generated in the first MG 11, and the second MG required torque is generated in the second MG 12. The required torque is a driving torque for applying a driving force to each of the drive wheels 19, or a braking torque for applying a braking force to each of the drive wheels 19.

The PM control unit 51 is configured to transmit the engine required drive torque to the engine control unit 52. To the engine control unit 52, various sensors (referred to as engine control sensors 35) required for the engine control and actuators for the engine control are connected. The engine control unit 52 is configured to carry out fuel injection control, ignition control, and intake air amount control based on the engine required drive torque. As a result, the engine 10 is driven to generate the engine required drive torque.

The PM control unit 51 is configured to stop the engine 10 when the vehicle starts, or travels at a low speed, and cause the vehicle to travel only by using the driving torque of the second MG 12. In this case, the first MG 11 is controlled so as not to generate a drive resistance. Thus, the second MG 12 can efficiently realize the driving without a drag resistance.

The PM control unit 51 is configured to, during normal travel, use the power distribution mechanism 15 to distribute the driving force of the engine 10 to two parts, transmit one part to the wheels 19 as the driving force, and transmit the other part to the first MG 11. As a result, the first MG 11 generates electric power. A part of the generated electric power is supplied to the battery 14. The second MG 12 is driven by the electric power generated by the first MG 11 and electric power supplied from the battery 14, thereby assisting the drive by the engine 10.

The PM control unit 51 is configured to, during deceleration (release of the accelerator pedal, namely, accelerator release) and a braking operation (operation on the brake pedal, namely, brake application), stop the engine 10, and cause the second MG 12 to be rotated by power transmitted from the respective drive wheels 19, thereby operating the second MG 12 as the generator to recover the generated electric power to the battery 14.

Moreover, the vehicle includes friction brake mechanisms 40, a brake actuator 45, and a brake electronic control unit 60 (referred to as brake ECU 60). The friction brake mechanism 40 is provided for each of the front/rear left/right wheels, but, in FIG. 1, only the friction brake mechanisms 40 provided for the left and right drive wheels 19 are illustrated. The friction brake mechanism 40 includes a brake disc 40a fixed to the wheel and a brake caliper 40b fixed to a body, and is configured to use a hydraulic pressure of working fluid supplied from the brake actuator 45 to operate a wheel cylinder built into the brake caliper 40b so as to press brake pads against the brake disc 40a, thereby generating a friction braking force.

The brake actuator 45 is a well-known actuator configured to adjust the hydraulic pressure to be supplied to the wheel cylinder built into the brake caliper 40b independently for each of the wheels. The brake actuator 45 includes a stepping force hydraulic circuit configured to, for example, supply to the wheel cylinder the hydraulic pressure from a master cylinder for using a stepping force applied to the brake pedal to pressurize the working fluid. In addition, the brake actuator 45 includes a control hydraulic circuit configured to supply control hydraulic pressures controllable independently of the brake pedal stepping force to the wheel cylinders independently of one another. The control hydraulic pressure circuit includes a power hydraulic pressure generation device including a pressurizing pump and an accumulator, and configured to generate a high hydraulic pressure, control valves each configured to adjust the hydraulic pressure output by the power hydraulic pressure generation device, thereby supplying a hydraulic pressure controlled to be a target hydraulic pressure for each of the wheel cylinders, and hydraulic pressure sensors each configured to detect the hydraulic pressure in each of the wheel cylinders (the above-mentioned components constructing the brake actuator 45 are not shown). As the brake actuator 45, a brake actuator known, for example, in Japanese Patent Application Laid-open No. 2014-19247 or the like can be applied.

The brake ECU 60 includes a microcomputer as a main component, and is provided so as to be able to mutually communicate to/from the PM control unit 51 of the hybrid ECU 50. The brake ECU 60 is connected to a brake sensor 61 configured to detect a brake pedal operation amount BP, a wheel speed sensor 62 configured to detect a wheel speed ωh of each of the front/rear left/right wheels, a yaw rate sensor 63 configured to detect a yaw rate δ of the vehicle, and a steering angle sensor 64 configured to detect a steering angle θ of a steering wheel.

The brake ECU 60 is configured to calculate a target braking force based on the braking operation amount BP, distribute this target braking force to a required friction braking force and a required regenerative braking force in accordance with a distribution characteristic set in advance, and transmit a regenerative braking required command representing the required regenerative braking force to the PM control unit 51 of the hybrid ECU 50. The PM control unit 51 is configured to use the second MG 12 to generate the regenerative braking force based on the required regenerative braking force, and transmit information representing an actual regenerative braking force, which is actually generated, to the brake ECU 60. The PM control unit 51 is configured to stop the engine 10 and use the electric power regeneration by the second MG 12 to apply the braking force to the drive wheels 19 during the normal travel, but, when the SOC of the battery 14 is close to a fully charged state, use engine braking to apply a braking force to the drive wheels 19 without the electric power regeneration.

The brake ECU 60 is configured to use a difference between the required regenerative braking force and the actual regenerative braking force to correct the required friction braking force, and calculate required friction braking forces for the respective wheels acquired by distributing the corrected required friction braking force to the four wheels. The brake ECU 60 is configured to control current supply to linear control valves provided for the brake actuator 45 to control the hydraulic pressures of the respective wheel cylinders so that the respective friction brake mechanisms 40 generate the required friction braking forces for the respective wheels.

The brake ECU 60 is configured to calculate the vehicle speed Vx based on the wheel speed ωh of each of the wheels detected by the wheel speed sensor 62. The calculated vehicle speed Vx is used as a detected value of the vehicle speed sensor 32.

Moreover, the vehicle includes a collision avoidance support electronic control unit 90 (referred to as collision avoidance support ECU 90). The collision avoidance support ECU 90 includes a microcomputer as a main component, and is provided so as to be able to mutually communicate to/from the brake ECU 60. The collision avoidance ECU 90 is connected to a radar sensor 91, a camera 92, a vehicle speed sensor 32, and a notification device 93.

The radar sensor 91 is configured to radiate a radio wave in a millimeter waveband in a forward direction, receive a reflected wave of the radio wave from an obstacle, calculate presence/absence of an obstacle, a distance to the obstacle, a relative speed with respect to the obstacle, and the like and output a calculation result to the collision avoidance support ECU 90. The camera 92 is configured to capture an image of a forward view of the vehicle, and output image data on the forward view to the collision avoidance support ECU 90. This image data is used to recognize a lane (white lines on both sides of a travel path). In the following, a description is given on the assumption that the "obstacle" is a "preceding vehicle".

The collision avoidance support ECU 90 is configured to determine the presence/absence of the preceding vehicle with which the own vehicle is highly likely to collide based on an output signal from the radar sensor 91, a vehicle speed Vx detected by the vehicle speed sensor 32, and the like. In other words, the collision avoidance support ECU 90 is configured to carry out the collision determination. Then, when the collision avoidance support ECU 90 detects a preceding vehicle with which the own vehicle is highly likely to collide, the collision avoidance support ECU 90 activates the notification device 93 to prompt the driver to carry out the brake operation. Further, the collision avoidance support ECU 90 transmits a brake pressurization assistance command for assisting the driver in the brake operation or an automatic braking command to the brake ECU 60. The brake ECU 60 is configured to control the brake actuator 45 in accordance with the command from the collision avoidance support ECU 90, to thereby generate a large friction braking force in the friction brake mechanisms 40. The brake control of avoiding, when an obstacle with which the own vehicle is highly likely to collide is detected, a collision with the obstacle in this way is referred to as collision avoidance support control.

As the collision avoidance support control, various methods are well known, and thus those well-known methods can be applied to the collision avoidance support control to be carried out by the collision avoidance support ECU 90. For example, the collision avoidance support ECU 90 is configured to acquire an inter-vehicle distance L between the own vehicle and the preceding vehicle, a relative speed Vr between the own vehicle and the preceding vehicle, and the speed Vx of the own vehicle based on the detection signals of the radar sensor 91 and the vehicle speed sensor 32. The collision avoidance support ECU 90 is configured to determine a state in which the own vehicle is determined to collide with the preceding vehicle when a vehicle speed Vf of the preceding vehicle is assumed to be maintained based on a relationship between the vehicle speed Vx and the relative speed Vr and the own vehicle decelerates at a constant deceleration Gc set in advance, as the state in which the own vehicle is highly likely to collide with the preceding vehicle.

When the collision avoidance support ECU 90 repeats this collision determination and determines that the own vehicle is highly likely to collide with the preceding vehicle, the collision avoidance support ECU 90 activates the notification device 93 to prompt the driver to carry out the brake operation, and transmits the brake pressurization assistance command to the brake ECU 60. When the brake ECU 60 receives the brake pressurization assistance command, the brake ECU 60 carries out pressurization assistance so that, when the driver depresses the brake pedal, the brake hydraulic pressures supplied to the wheel cylinders are larger than those in a normal state. Thus, the braking force generated in response to a pedal depression amount of the driver increases, and a large braking force can thus be generated.

Moreover, in the above-mentioned collision avoidance support control, the collision avoidance support ECU 90 increases the brake hydraulic pressure generated by the brake operation by the driver, but when the collision avoidance support ECU 90 determines that the own vehicle is highly likely to collide with the preceding vehicle, the automatic braking of supplying the brake hydraulic pressures to the wheel cylinders may be carried out without necessitating the braking operation by the driver.

While the collision avoidance support ECU 90 is carrying out the collision avoidance support control, that is, while the collision avoidance support ECU 90 has determined that the own vehicle is highly likely to collide with the preceding vehicle, the collision avoidance support ECU 90 transmits a flag signal representing that the collision avoidance support control is being carried out to a predictive deceleration support control unit 70 (described later) provided in the hybrid ECU 50. This flag signal is referred to as collision avoidance support control flag F. When the value of the collision avoidance support control flag F is "0", the collision avoidance support control flag F represents a state in which the collision avoidance support control is not being carried out. When the value of the collision avoidance support control flag F is "1", the collision avoidance support control flag F represents a state in which the collision avoidance support control is being carried out.

The hybrid ECU 50 includes the predictive deceleration support control unit 70 in addition to the above-mentioned PM control unit 51, the engine control unit 52, and the MG control unit 53. The predictive deceleration support control unit 70 includes a microcomputer as a main component, and is constructed, in terms of functions, by a target setting unit 71, a support execution unit 72, and an execution restriction unit 73.

This predictive deceleration support control unit 70 is a control unit configured to support the driver for ecological drive. For example, when the driver stops the vehicle at an intersection or the like, and an emergency braking operation is carried out immediately before a stop line, a large braking force needs to be temporarily applied to the wheels. There is an upper limit for a charge current that can be supplied to the battery 14, and hence the braking force that can be generated by the electric power regeneration is also limited. Upon the emergency braking operation, the required braking force temporarily exceeds the braking force that can be generated by the electric power regeneration, and thus an insufficient amount of the braking force is compensated by the friction braking force by the friction brake mechanisms 40. In this case, energy that could have been recovered as electric power if the braking operation had started as early as that of an ecological driver is released in vain as thermal energy generated by the friction brake mechanisms 40.

In order to reduce the wasteful energy release, the predictive deceleration support control unit 70 is configured to predict a state in which the driver carries out the braking operation based on at least the position of the vehicle (own vehicle), and carry out accelerator release guidance at a timing at which the ecological drive can be realized. The accelerator release guidance is to give a notification for prompting the driver to release the accelerator pedal. The predictive deceleration support control unit 70 is configured to cause the regenerative braking force (regenerative braking force corresponding to the so-called engine braking) when the accelerator pedal is released after a predetermined period (ts seconds) has elapsed since the accelerator release guidance to be larger than usual, thereby increasing an electric power regeneration amount recovered to the battery 14 (amount of the electric power recovered to the battery 14). As a result, the driver can carry out the ecological drive.

The predictive deceleration support control unit 70 is connected to a navigation device 80, the vehicle speed sensor 32, the brake sensor 61, the accelerator sensor 31, and a display 81. The navigation device 80 includes a GPS sensor configured to detect a current position of the own vehicle based on radio waves from the GPS satellites, an acceleration sensor configured to detect a travel direction of the own vehicle, a storage device configured to store road information, a wireless communication device configured to receive road information and the like from the outside, a display panel (including a sound device) configured to provide various types of information to the driver, and a main control unit configured to calculate a path to a destination set by the driver, an arrival time point, and the like, thereby carrying out route guidance. "Vehicle" as used herein refers to the own vehicle unless otherwise stated.

The road information includes road map information, road type information, road shape information, legal speed information, intersection position information, stop line position information, traffic light information, and congestion information. The navigation device 80 is configured to acquire the traffic light information and the congestion information through a signal transmitted from an external communication device 100 (e.g., a beacon) installed on the road.

The target setting unit 71 is configured to learn positions on a map at which the driver frequently releases the brake pedal (releases a stepping force applied to the brake pedal) from an ordinary drive operation by the driver, and register the learned positions as target deceleration end positions in a nonvolatile memory. Moreover, the target setting unit 71 is configured to associate the vehicle speed Vx when the vehicle reaches the final deceleration end position as a target deceleration end vehicle speed with the final deceleration end position, and register the vehicle speed Vx and the target deceleration end vehicle speed in association with each other to the nonvolatile memory.

For example, at a position at which the driver is obliged to temporarily stop the vehicle, the driver depresses the brake pedal to stop the vehicle, and then, switches the foot from the brake pedal to the accelerator pedal to start the vehicle travel. In this case, the stop position of the vehicle can be estimated to be the position at which the brake pedal is released. In this case, the target deceleration end position is the stop position of the vehicle, and the target deceleration end vehicle speed is zero.

Moreover, when the travel path is curved, the driver decelerates the vehicle before the curve, and when the deceleration is completed, switches the foot from the brake pedal to the accelerator pedal, and passes the curve. In this case, the target deceleration end position is the vehicle position at which the brake pedal is released, and the target deceleration end vehicle speed is a vehicle speed at which the deceleration is finished (vehicle speed at which the brake pedal is released).

While an ignition switch is on, the target setting unit 71 acquires, in order to learn the target deceleration end position and the target deceleration end vehicle speed, a brake pedal signal detected by the brake sensor 61, a vehicle speed signal detected by the vehicle speed sensor 32, and position information (including travel direction information) on the vehicle detected by the navigation device 80. When the vehicle is located on the road, the target setting unit 71 stores the own vehicle position and the vehicle speed Vx in association with each other each time the brake pedal is released, which is represented by the brake pedal signal. The target setting unit 71 calculates a frequency of the release of the brake pedal at each of the stored own vehicle positions, and extracts the own vehicle positions higher in the frequency of the release of the brake pedal than a threshold. In other words, the own vehicle positions at which the release of the brake pedal is highly possibly reproduced in the ordinary drive operation of the driver are extracted. The target setting unit 71 registers each of the extracted own vehicle positions as the target deceleration end position, and registers an average of the vehicle speeds Vx stored in association with the vehicle positions as the final target deceleration end vehicle speed.

The target setting unit 71 is configured to determine whether or not a registered target deceleration end position exists on a road that is within a predetermined distance (e.g., some hundreds meters) from the own vehicle position, and on which the own vehicle is predicted to travel. When the determination result is an affirmative determination, the target setting unit 71 sets the target deceleration end position as a target deceleration end position P0* to be subjected to the predictive deceleration support control. Then, the target setting unit 71 supplies the set target deceleration end position P0* and a target deceleration end vehicle speed V0* associated with the target deceleration end position P0* to the support execution unit 72.

The target deceleration end position is not limited to the position acquired by the learning in this way. For example, the target setting unit 71 is configured to read the traffic light information received by the navigation device 80 (traffic light information transmitted from the external communication device 100 installed on the road). This traffic light information includes state information for determining which of an entrance permission state (display color: blue), an entrance inhibition state (display color: red), and an entrance warning state (display color: yellow) the traffic light is in, identification information of the traffic light, and switching information representing a display switching time interval of the traffic light. The target setting unit 71 is configured to predict the traffic light state when the own vehicle reaches the stop line of the intersection at which the traffic light is installed based on the traffic light information, the distance from the own vehicle position to the stop line position of the intersection at which the traffic light is installed, and the current vehicle speed Vx. In other words, whether or not the driver stops the own vehicle at the stop line is predicted.

When the target setting unit 71 predicts that the driver stops the vehicle at the stop line, the target setting unit 71 sets the position of the stop line of the intersection to the target deceleration end position P0*, and sets the target deceleration end vehicle speed V0* to zero. The target setting unit 71 is configured to supply the set target deceleration end position P0* and the target deceleration end vehicle speed V0* associated with the target deceleration end position P0* to the support execution unit 72. The target setting unit 71 is configured to set the target deceleration end position P0* and the target deceleration end vehicle speed V0* included in a subject range within a predetermined distance (e.g., some hundreds meters) from the own vehicle position.

Figure 3:
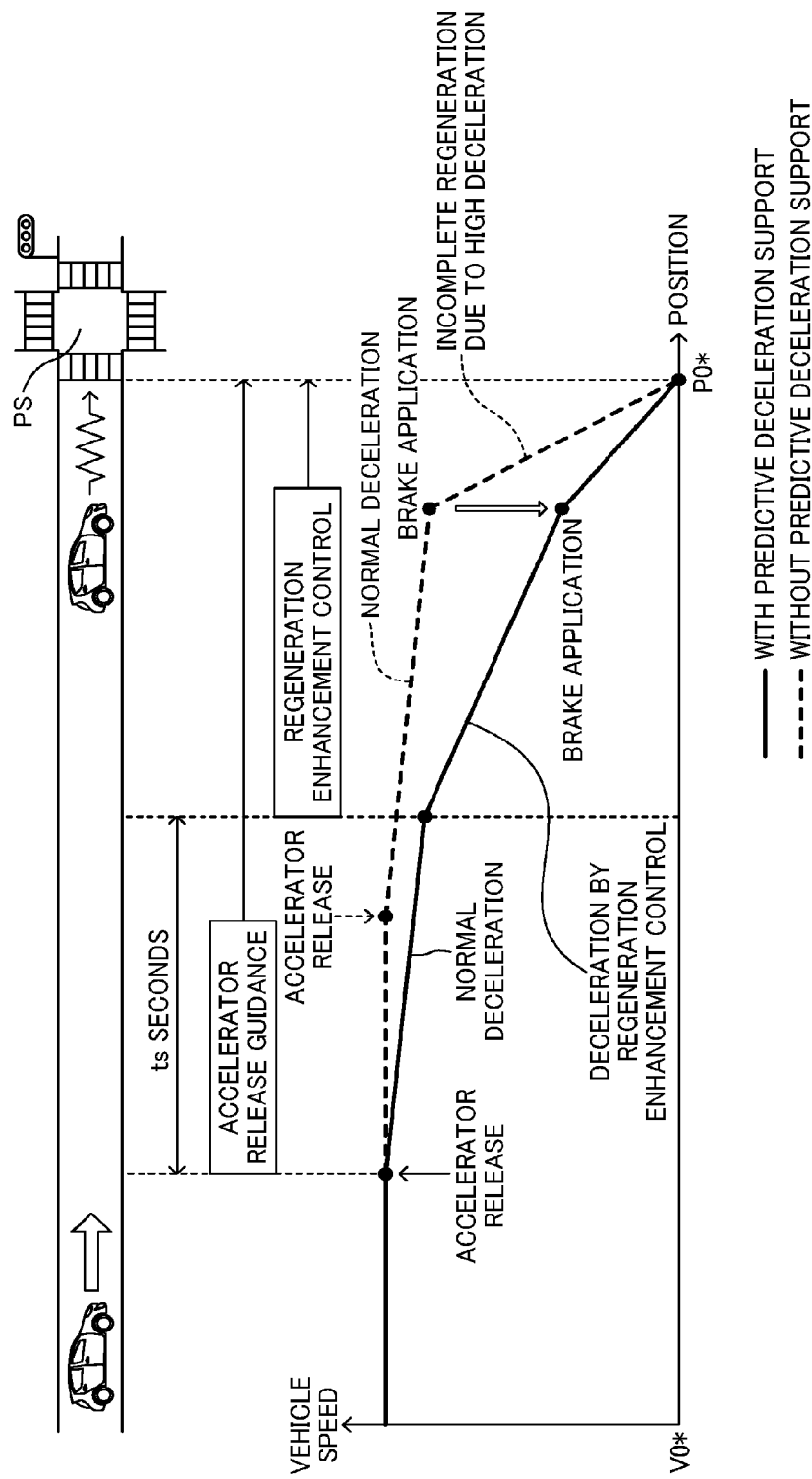
FIG. 3 is an explanatory diagram for schematically showing a transition of a vehicle speed by predictive deceleration support control.

The support execution unit 72 is a control unit configured to support the driver in carrying out the ecological drive so as to efficiently generate the regenerative electric power when the vehicle decelerates toward the target deceleration end position P0*. First, a description is given of an overview of the predictive deceleration support control carried out by the support execution unit 72. FIG. 3 is a graph for schematically showing a transition of the vehicle speed when the driver decelerates the vehicle toward the target deceleration end position P0*. The solid line of the graph represents a transition of the vehicle speed when the predictive deceleration support control is carried out by the support execution unit 72. The broken line of the graph represents a transition of the vehicle speed when the predictive deceleration support control is not carried out (in the normal state). In this example, the target deceleration end position P0* is the stop position of an intersection PS, and the target deceleration end vehicle speed V0* is zero.

When the vehicle is predicted to finish the deceleration at the target deceleration end position P0* (in this example, when the vehicle is predicted to stop at the stop line of the intersection PS), the support execution unit 72 first guides the driver to release the accelerator pedal at a timing at which the ecological drive can be realized. In other words, accelerator release guidance is carried out. When the driver follows the accelerator release guidance to release the accelerator pedal, the regenerative braking force (corresponding to so-called engine braking) is generated. The example represented by the solid line of FIG. 3 is an example in which the accelerator pedal is released simultaneously with the accelerator release guidance.

The support execution unit 72 increases the deceleration of the vehicle after ts seconds since the accelerator release guidance, thereby increasing the electric power regeneration amount when the accelerator pedal is released. The control of increasing the deceleration of the vehicle to increase the electric power generation amount in this way when the accelerator pedal is released is referred to as regeneration enhancement control. The vehicle speed has considerably decreased at a time point when the driver operates the brake pedal (at a time point of the brake application). Thus, the failure to fully harvest the regenerative electric power due to emergency braking is prevented.

On the other hand, when the predictive deceleration support control is not carried out (refer to the broken line of FIG. 3), the vehicle travels toward the target deceleration end position P0* while the deceleration remains low, and the driver thus tends to carry out the braking operation under a state in which the vehicle speed is high, with the result that the regenerative electric power tends to fail to be fully harvested. The magnitude of the deceleration is discussed in terms of the magnitude of the absolute value of the deceleration.

The support execution unit 72 is configured to use the display 81 installed in front of a driver's seat to carry out the accelerator release guidance. On the display 81, a display region for carrying out the accelerator release guidance is formed, and the display 81 is configured to carry out display for guiding the driver to release the accelerator pedal based on the accelerator release signal output from the support execution unit 72. The accelerator release guidance displayed on the display 81 only needs to guide the driver to release the accelerator pedal, and can be carried out in various display forms such as illustrations, marks, and characters. Moreover, the accelerator release guidance is not limited to the configuration of using the display 81 to give a notification to the driver, and may employ such a configuration as to use the sound device (e.g., a sound announce) to give a notification to the driver.

A specific description is now given of the predictive deceleration support control carried out by the support execution unit 72. When the target deceleration end position P0* and the target deceleration end vehicle speed V0* are supplied from the target setting unit 71, the support execution unit 72 starts the predictive deceleration support control.

Figure 4:
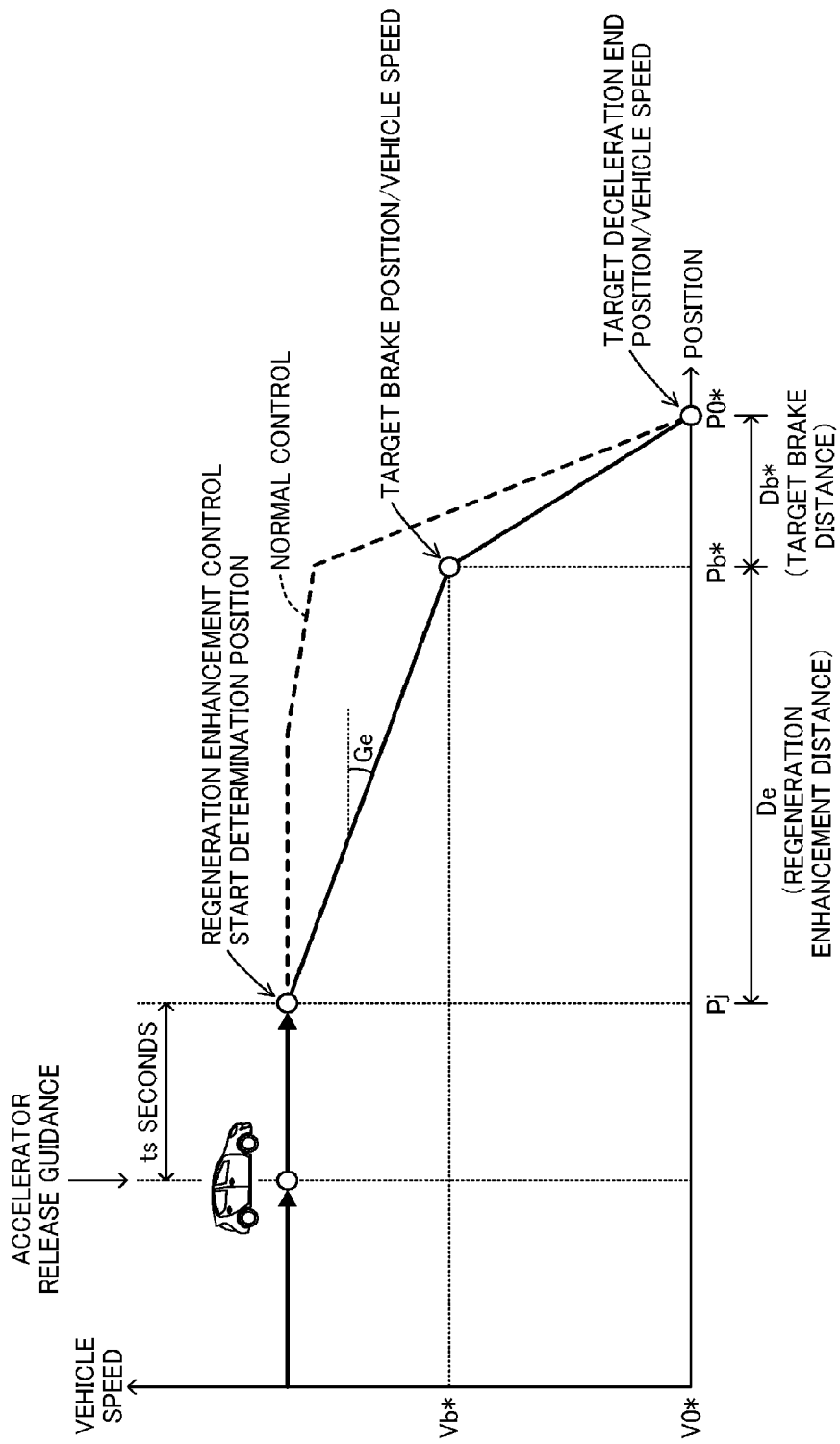
FIG. 4 is an explanatory diagram for showing respective target values for the predictive deceleration support control.

As shown in FIG. 4, the support execution unit 72 is configured to calculate a target brake position Pb* that is a position at which the modeled ecological driver starts the brake pedal operation, and a target brake vehicle speed Vb* that is a vehicle speed when this braking operation starts. The target brake position Pb* represents a start position of the brake pedal operation when the ecological driver (driver carrying out an ideal drive that does not waste the energy) drives the vehicle to decelerate at a predetermined deceleration so that the vehicle speed when the vehicle reaches the target deceleration end position P0* matches the target brake vehicle speed Vb*.

The support execution unit 72 is configured to determine the timing at which the accelerator release guidance is started so that the target brake position Pb* and the target brake vehicle speed Vb* are attained (an actual position at which the driver starts the brake pedal operation, and an actual vehicle speed at this time point match the target brake position Pb* and the target brake vehicle speed Vb*, respectively).

A description is now given of a method of acquiring the target brake position Pb* and the target brake vehicle speed Vb* and a determination method for the timing at which the accelerator release guidance is started.

The target brake position Pb* and the target brake vehicle speed Vb* are calculated based on the target deceleration end position P0* and the target deceleration end vehicle speed V0* supplied from the target setting unit 71. As described above, the target deceleration end position P0* is the position at which the vehicle is predicted to stop or a position at which the deceleration of the vehicle is finished, for example, during the curve travel. The target deceleration end vehicle speed V0* is zero, for example, when the target deceleration end position P0* is a stop position, and is a vehicle speed at a position at which the deceleration for safely traveling on the curve is finished when the target deceleration end position P0* is the deceleration end position immediately before the entrance to the curve. As the target deceleration end vehicle speed V0* at this deceleration end position, the learned value registered to the target setting unit 71 may be employed. The target deceleration end position P0* and the target deceleration end vehicle speed V0* immediately before the entrance to the curve may be set, for example, based on a shape (e.g., a curvature) of a travel path acquired by the navigation device 80.

The target brake vehicle speed Vb* is set, for example, to a value acquired by adding a predetermined additional vehicle speed to the target deceleration end vehicle speed V0*. As this predetermined additional vehicle speed, a value acquired on the assumption that the ecological driver carries out the braking operation is employed. The predetermined additional vehicle speed is preferably calculated by considering an average inclination of a road from the own vehicle position to the target deceleration end position P0* (acquired from the road information in the navigation device 80), but may be a constant value.

As shown in FIG. 4, the target brake position Pb* is identified as a remaining distance to the target deceleration end position P0*. This distance between the target brake position Pb* and the target deceleration end position P0* is referred to as target brake distance Db*.

The target brake distance Db* is a travel distance after the start of the braking operation until the vehicle reaches the target deceleration end position P0*, for example, in a case in which the vehicle is decelerated at the deceleration (referred to as ecological brake deceleration) at which the ecological driver carries out the braking operation. Thus, the target brake distance Db* is uniquely determined by the target brake vehicle speed Vb*, the target deceleration end vehicle speed V0*, and the ecological brake deceleration.

Figure 5:
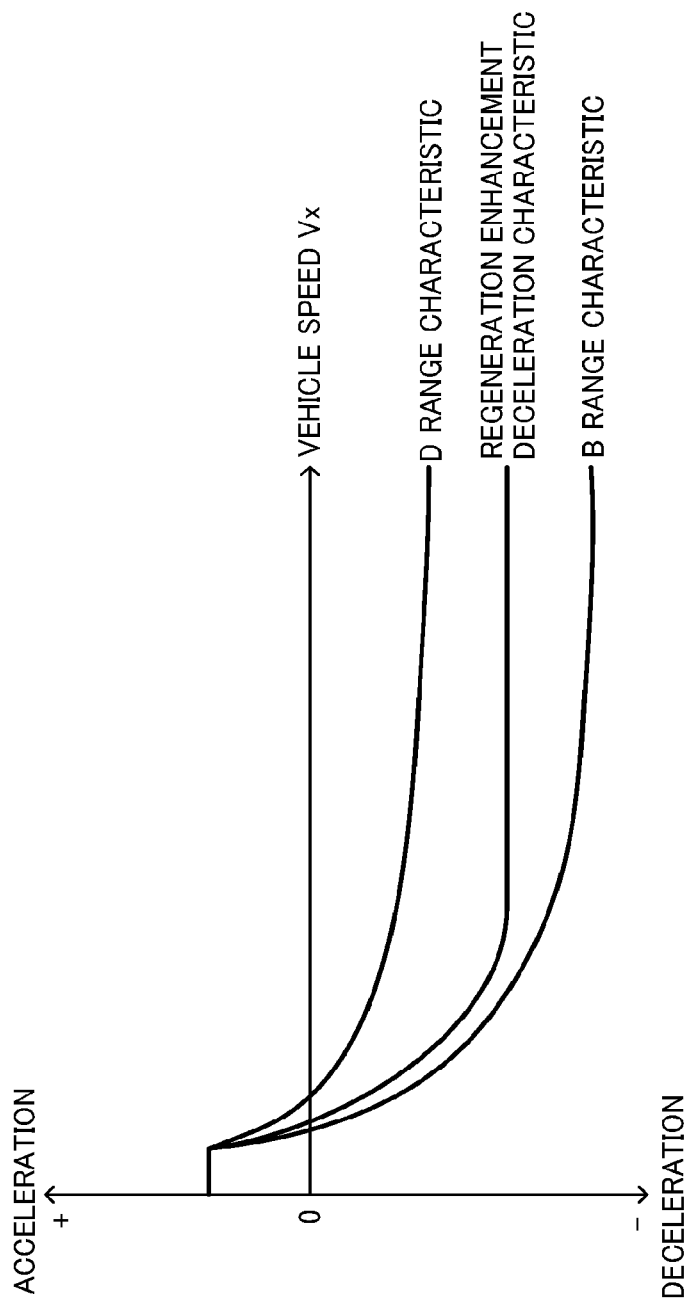
FIG. 5 is a graph for showing deceleration characteristics.

The support execution unit 72 is configured to start the regeneration enhancement control after the elapse of is seconds since the accelerator release guidance is performed. As shown in FIG. 5, the support execution unit 72 is configured to change a deceleration characteristic at the time when the acceleration pedal is released from a D range characteristic described later to a regeneration enhancement deceleration characteristic, to thereby increase the regenerative braking force, resulting in an increase in the electric power recovered to the battery 14 as compared to the normal state.

When the accelerator pedal is released, a braking force is generated. The braking force is usually referred to as engine braking, and, in the hybrid vehicle of this embodiment, is not generated by the friction of the engine 10 (because the rotation of the engine 10 is stopped), but is the regenerative braking force generated by the regenerative electric power recovered to the battery 14 by the second MG 12. When the regeneration enhancement control is carried out, the deceleration characteristic is changed. The electric power recovery to the battery 14 is controlled by the PM control unit 51. Thus, when the regeneration enhancement control is carried out, the support execution unit 72 transmits a command for carrying out the regeneration enhancement control to the PM control unit 51.

As shown in FIG. 5, the deceleration when the accelerator pedal is released is set depending on the vehicle speed Vx. In the vehicle of this embodiment, a D range for normal travel and a B range for travel requiring strong engine braking can be selected by a shift lever operation. As the deceleration characteristic, the D range characteristic is applied when the D range is selected, and a B range characteristic is applied when the B range is selected. The D range characteristic is small in the deceleration to be set with respect to the vehicle speed Vx as compared to the B range characteristic. When the D range is selected by the shift lever, the braking force is controlled to be generated only by the electric power recovery to the battery 14, and when the B range is selected, in addition to the regenerative braking force, the braking force is controlled to be generated by the engine braking (friction of the engine 10).

The regeneration enhancement control is carried out when the D range is set, and a deceleration characteristic (regeneration enhancement deceleration characteristic) on this occasion is set so that the deceleration is more than that of the D range characteristic. The regeneration enhancement deceleration characteristic of this embodiment is a characteristic between the D range characteristic and the B range characteristic, and is set to a characteristic closer to the B range characteristic. Thus, larger regenerative electric power is acquired in the regeneration enhancement control as compared to that of the normal state.

In order to realize the regeneration enhancement deceleration characteristic in this way, the PM control unit 51 is configured to store a normal control map and a regeneration enhancement control map (represented by the broken line) separately as a map (referred to as accelerator release map) for setting the relationship at the accelerator opening degree of 0% in the driver required torque map shown in FIG. 2. The normal control map sets the "relationship between vehicle speed Vx and driver required torque Td*" providing the deceleration of the D range characteristic. The regeneration enhancement control map sets the "relationship between vehicle speed Vx and driver required torque Td*" providing the regeneration enhancement deceleration characteristic.

When the regeneration enhancement control is carried out, the support execution unit 72 transmits a regeneration enhancement control start command to the PM control unit 51. As a result, the PM control unit 51 switches the accelerator release map from the normal control map to the regeneration enhancement control map.

When the predictive deceleration support control is carried out, the support execution unit 72 first carries out the accelerator release guidance, and then carries out the regeneration enhancement control at the timing after ts seconds since the accelerator release guidance. ts seconds are a period set by considering a delay from the accelerator release guidance to the actual release of the accelerator pedal by the driver.

On this occasion, in order to determine the timing for the accelerator release guidance, an own vehicle position (future position to be reached at the current vehicle speed Vx after ts seconds) to be reached after ts seconds from the own vehicle position at the current time point is defined as a position (referred to as regeneration enhancement control start determination position Pj) for determining whether or not the regeneration enhancement control is to be started. The support execution unit 72 determines whether or not the regeneration enhancement control start determination position Pj calculated at the current time point is the position for starting the regeneration enhancement control. In this determination, in a case in which the vehicle speed Vx when the own vehicle position reaches the target brake position Pb* matches the target brake vehicle speed Vb* after the regeneration enhancement control is started, the regeneration enhancement control start determination position Pj is determined to be the position for starting the regeneration enhancement control.

In order to acquire the start timing for the regeneration enhancement control, the support execution unit 72 is configured to calculate a vehicle speed (referred to as estimated brake vehicle speed Vb) when the vehicle reaches the target brake position Pb* in a case in which the regeneration enhancement control is started at the regeneration enhancement control determination position Pj at the current time point. A distance (referred to as regeneration enhancement distance De) from the regeneration enhancement control start determination position Pj at the current time point to the target brake position Pb* is acquired by subtracting a sum (Vx·ts+Db*) of the distance over which the vehicle travels at the vehicle speed Vx for is seconds (Vx·ts) and the target brake distance Db* from a distance (measured by the navigation device 80) from the own vehicle position at the current time point to the target deceleration end position P0*. Thus, the estimated brake vehicle speed Vb can be calculated as a vehicle speed after the vehicle travels over the regeneration enhancement distance De while decelerating at the regeneration enhancement deceleration Ge from the current vehicle speed Vx as an initial vehicle speed. The regeneration enhancement deceleration Ge changes depending on the vehicle speed Vx, and, in order to calculate the estimated brake vehicle speed Vb, it is preferred that the vehicle speed be divided into a plurality of vehicle speed segments in terms of the regeneration enhancement deceleration characteristic, and the regeneration enhancement deceleration Ge be set for each of the vehicle speed segments.

The support execution unit 72 is configured to calculate the estimated brake vehicle speed Vb at a predetermined calculation cycle, and compare the estimated brake vehicle speed Vb and the target brake vehicle speed Vb* to each other. The support execution unit 72 is configured to start the accelerator release guidance at a timing when the estimated brake vehicle speed Vb exceeds the target brake vehicle speed Vb*, and start the regeneration enhancement control at a timing when both a condition that ts seconds have elapsed since the accelerator release guidance and a condition that the release of the accelerator pedal is detected are satisfied. Thus, when the release of the accelerator pedal is detected before ts seconds have elapsed since the accelerator release guidance, the regeneration enhancement control is started at the time point when ts seconds have elapsed since the accelerator release guidance. Moreover, when the release of the accelerator pedal is detected after ts seconds have elapsed since the accelerator release guidance, the regeneration enhancement control is started at the time point when the release of the accelerator pedal is detected.

Figure 6:
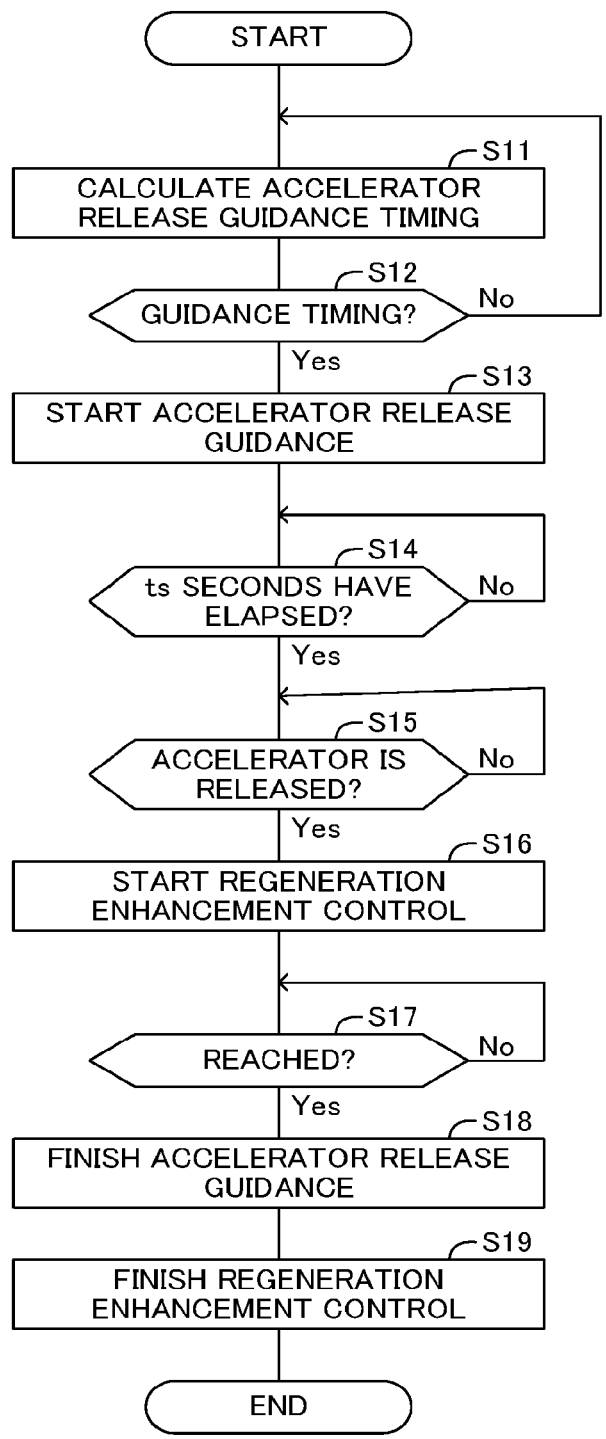
FIG. 6 is a flowchart for illustrating a predictive deceleration support control routine.

FIG. 6 is a flowchart for illustrating a predictive deceleration support control routine, which is processing to be carried out by the support execution unit 72. The processing in each step is as described above, and a description is thus mainly given of a flow of the respective pieces of the processing.

When the target deceleration end position P0* and the target deceleration end vehicle speed V0* are supplied from the target setting unit 71, the support execution unit 72 starts the predictive deceleration support control routine. In Step S11, the support execution unit 72 calculates the timing for carrying out the accelerator release guidance. The timing for carrying out the accelerator release guidance is the timing at which the estimated brake vehicle speed Vb is determined to exceed the target brake vehicle speed Vb*. Thus, in Step S11, the estimated brake vehicle speed Vb and the target brake vehicle speed Vb* are calculated, and the brake vehicle speed Vb and the target brake vehicle speed Vb* are compared to each other.

Then, in Step S12, the support execution unit 72 determines whether or not the current time point is the timing for carrying out the accelerator release guidance. The support execution unit 72 repeats the processing in Steps S11 and S12 at a predetermined calculation cycle until the current timing is determined to be the timing for carrying out the accelerator release guidance.

When the support execution unit 72 determines that the current timing is the timing for carrying out the accelerator release guidance (Yes in Step S12), in Step S13, the support execution unit 72 uses the display 81 to start the accelerator release guidance.

Then, in Step S14, the support execution unit 72 waits until is seconds have elapsed since the start of the accelerator release guidance, and, in Step S15, determines whether or not the accelerator pedal is released. The support execution unit 72 repeats the processing in Step S15 at a predetermined calculation cycle until the release of the accelerator pedal is detected.

When the release of the accelerator pedal is detected, or has been detected, in Step S16, the support execution unit 72 starts the regeneration enhancement control. In this case, the support execution unit 72 transmits the regeneration enhancement control start command to the PM control unit 51.

When the PM control unit 51 receives the regeneration enhancement control start command, the PM control unit 51 switches the accelerator release map, which is the map for the accelerator opening degree of 0% in the driver required torque map, from the normal control map to the regeneration enhancement control map. In this case, the deceleration characteristic is preferably switched gradually rather than switched quickly.

The PM control unit 51 refers to the regeneration enhancement control map, and controls the inverter 13 so that the driver required torque (braking torque) corresponding to the vehicle speed Vx is generated from the second MG 12. In this case, the PM control unit 51 does not cause the engine braking to be generated through the friction of the engine 10, and uses only the electric power recovered to the battery 14 to decelerate the vehicle.

When the regeneration enhancement control is started, in Step S17, the support execution unit 72 determines whether or not the vehicle has reached the target deceleration end position P0*. The support execution unit 72 repeats the processing in Step S17 at a predetermined calculation cycle.

While the regeneration enhancement control is being carried out, when the vehicle approaches a position (e.g., an intersection) at which the vehicle needs to be stopped or a position (e.g., a curve) at which the vehicle needs to be decelerated, the driver depresses the brake pedal. As a result, the brake ECU 60 transmits the required regenerative braking force corresponding to the braking operation amount to the PM control unit 51. The PM control unit 51 increases the regenerative braking force based on the required regenerative braking force while maintaining the regeneration enhancement control.

When the support execution unit 72 determines that the vehicle reaches the target deceleration end position P0*, the support execution unit 72 finishes the accelerator release guidance in Step S18, and finishes the regeneration enhancement control in Step S19. In this case, the support execution unit 72 transmits a regeneration enhancement control end command to the PM control unit 51. As a result, the PM control unit 51 returns the accelerator release map from the regeneration enhancement control map to the normal control map.

When the support execution unit 72 finishes the regeneration enhancement control, the support execution unit 72 finishes the predictive deceleration support control routine.

The predictive deceleration support control predicts the state in which the driver carries out the braking operation, and carries out the accelerator release guidance at the timing at which the ecological drive can be realized before the driver actually carries out the deceleration operation. Then, the braking force when the driver is not carrying out the pedal operation (the accelerator pedal operation or the brake pedal operation) is generated at the regeneration enhancement deceleration Ge larger than that in the normal state (state in which the predictive deceleration support control is not being carried out). Thus, as shown in FIG. 3, the driver carries out the brake pedal operation at the time point when the vehicle has considerably decelerated, and a braking operation amount (depression stroke) thus decreases. As a result, the driver can be prevented from carrying out the emergency braking operation.

The target braking force set in correspondence to the braking operation amount is assigned preferentially to the regenerative braking force generated by the electric power recovered to the battery 14, and an amount that cannot be generated only by the regenerative braking force is assigned to the friction braking force by the friction brake mechanisms 40. Thus, when the predictive deceleration support control that decreases the braking operation amount is carried out, most of the target braking force can be assigned to the regenerative braking force.

On the other hand, in a case in which the predictive deceleration support control is not carried out, even when the driver releases the accelerator pedal, the deceleration characteristic is set to the D range characteristic, and the deceleration is thus low. Therefore, the driver carries out the brake pedal operation when the vehicle has not been sufficiently decelerated, resulting in a large braking operation amount. As a result, the target braking force exceeds the upper limit of the regenerative braking force determined by the electric energy that can be supplied to the battery 14, and the distribution to the friction braking force increases accordingly. In this case, the kinetic energy of the wheels cannot be efficiently used to charge the battery 14, and is converted into thermal energy by the friction brake mechanisms 40 to be released. In other words, the electric power that could have been recovered by the ecological driver cannot be fully harvested.

Thus, the predictive deceleration control enables the battery 14 to be efficiently charged, to thereby be able to improve the fuel consumption of the vehicle.

Incidentally, both the regeneration enhancement control and the collision avoidance support control may simultaneously be carried out. In this case, when the regeneration enhancement control is finished first during the execution of the collision avoidance support control, the deceleration of the vehicle may rapidly decrease when the regeneration enhancement control is finished. The regeneration enhancement control is finished when the vehicle reaches a target deceleration end position. Therefore, for example, under a state in which the vehicle is predicted to stop at the target deceleration end position, when the vehicle passes the target deceleration end position, the deceleration of the vehicle rapidly decreases at a time point when the vehicle passes the target deceleration end position.

As described above, the collision avoidance support ECU 90 determines the possibility of the collision with the preceding vehicle based on the inter-vehicle distance L between the own vehicle and the preceding vehicle, the relative speed Vr between the own vehicle and the preceding vehicle Vr, and the vehicle speed Vx of the own vehicle, thereby controlling the braking force. Thus, the unexpected decrease in the deceleration of the own vehicle may cause deterioration in performance of the collision avoidance support control.

Thus, the predictive deceleration support control unit 70 includes the execution restriction unit 73 configured to recognize a state of the execution of the collision avoidance support control, and restrict the execution of the predictive deceleration support control routine depending on the state. The execution restriction unit 73 is configured to recognize the state of the execution of the collision avoidance support control based on the collision avoidance support control flag F output from the collision avoidance support ECU 90.

Figure 7:
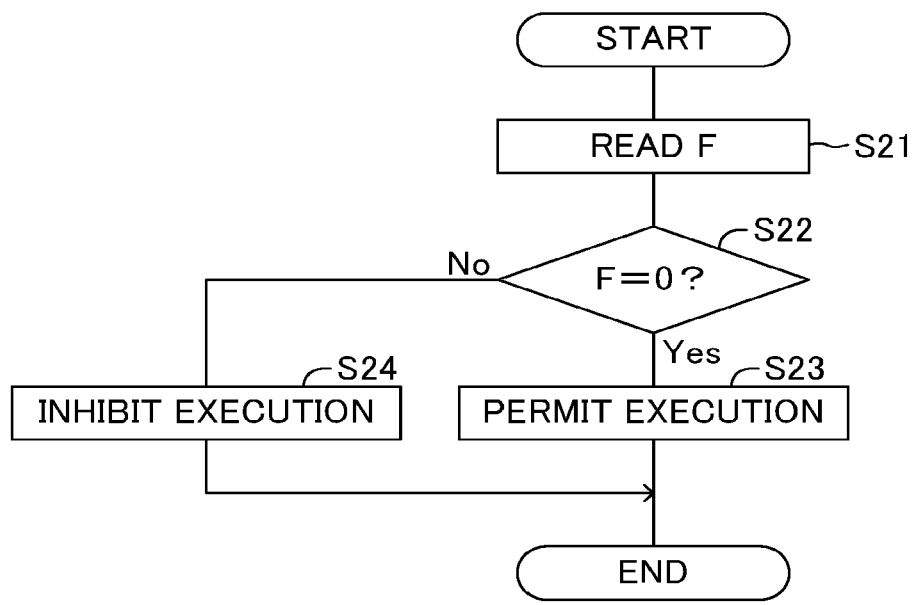
FIG. 7 is a flowchart for illustrating a deceleration support execution restriction routine.

FIG. 7 is a flowchart for illustrating a deceleration support execution restriction routine to be executed by the execution restriction unit 73. The deceleration support execution restriction routine is repeated at a predetermined short calculation cycle. When the deceleration support execution restriction routine is activated, in Step S21, the execution restriction unit 73 reads the latest collision avoidance support control flag F transmitted from the collision avoidance support ECU 90. As described above, the collision avoidance support ECU 90 transmits the collision avoidance support control flag F representing whether or not the collision avoidance support control is being carried out at a predetermined short calculation cycle. When the value of the collision avoidance support control flag F is "0", the collision avoidance support control flag F represents the state in which the collision avoidance support control is not being carried out. When the value of the collision avoidance support control flag F is "1", the collision avoidance support control flag F represents the state in which the collision avoidance support control is being carried out.

Then, in Step S22, the execution restriction unit 73 determines whether or not the value of the collision avoidance support control flag F is "0". When the value of the collision avoidance support control flag F is "0", in Step S23, the execution restriction unit 73 outputs an execution permission determination signal of the predictive deceleration support control routine to the support execution unit 72. When the predictive deceleration support control routine is being carried out, the support execution unit 72 reads the determination signal output by the execution restriction unit 73 at a predetermined interrupt cycle, and continues the execution of the predictive deceleration support control routine as long as the execution permission determination signal is being output from the execution restriction unit 73.

After this processing is repeated, when the value of the collision avoidance support control flag F is switched to "1", in Step S24, the execution restriction unit 73 outputs an execution inhibition determination signal of the predictive deceleration support control routine to the support execution unit 72. When the support execution unit 72 reads the execution inhibition determination signal, the support execution unit 72 finishes the predictive deceleration support control routine. For example, when the execution inhibition determination signal is read (when the collision avoidance support control has been started) under the state in which the accelerator release guidance is being carried out or the accelerator release guidance and the regeneration enhancement control are being carried out, the support execution unit 72 immediately finishes the accelerator release guidance, or the accelerator release guidance and the regeneration enhancement control.

The execution restriction unit 73 repeats the deceleration support execution restriction routine at a predetermined calculation cycle. Thus, while the execution inhibition determination signal is output from the execution restriction unit 73, the support execution unit 72 is inhibited from starting the accelerator release guidance and the regeneration enhancement control.

The accelerator release guidance does not always need to be finished or inhibited when the collision avoidance support control is being carried out. In other words, the execution restriction unit 73 only needs to be configured to finish or inhibit at least the regeneration enhancement control when the collision avoidance support control is being carried out.

Figure 8:
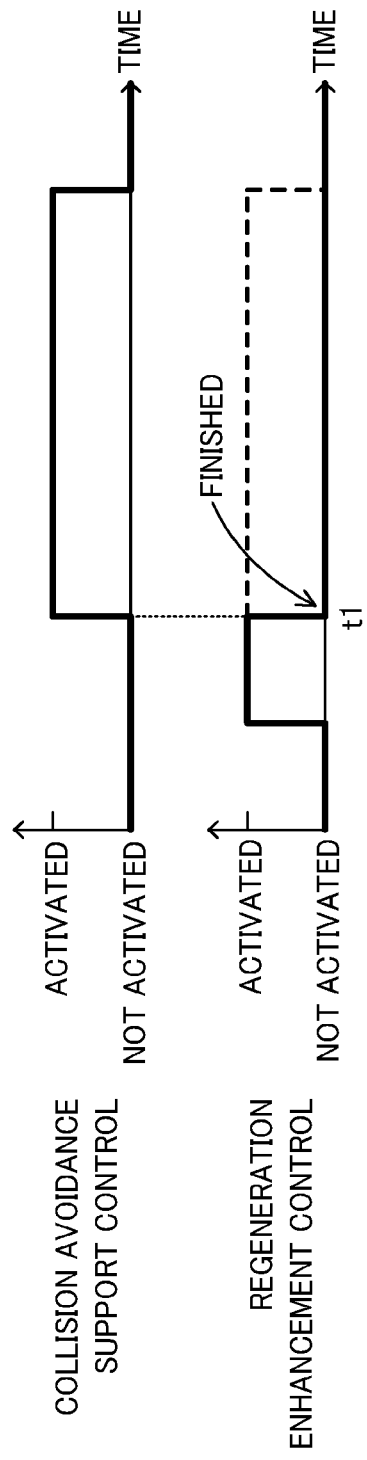
FIG. 8 is a timing chart for illustrating regeneration enhancement control and collision avoidance support control.
Figure 9:
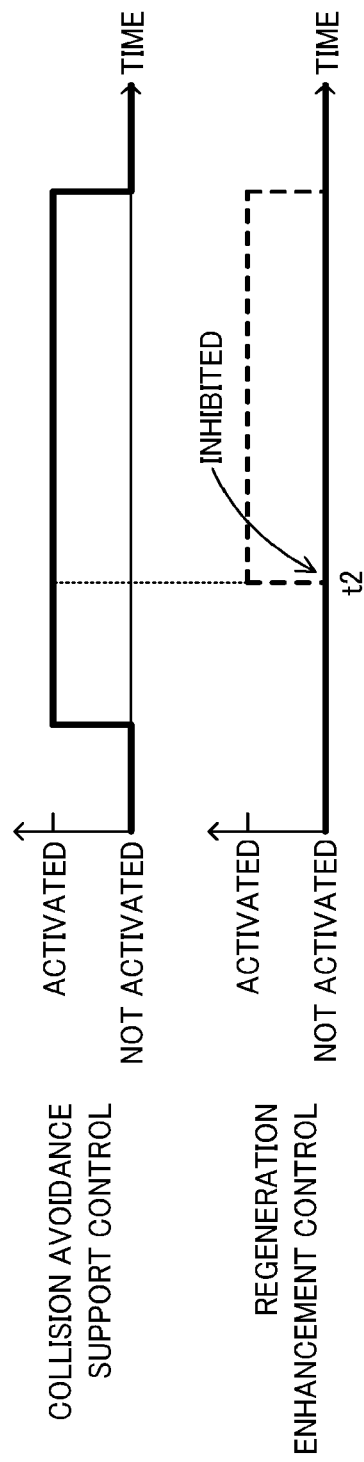
FIG. 9 is a timing chart for illustrating the regeneration enhancement control and the collision avoidance support control.

FIG. 8 and FIG. 9 are illustrations of activation states when the regeneration enhancement control and the collision avoidance support control are prevented from being simultaneously carried out. As illustrated in FIG. 8, when the collision avoidance support control is started at a time point t1 while the regeneration enhancement control is being carried out, the regeneration enhancement control, which is originally to be continued until the vehicle reaches the target deceleration end position as represented by the broken lines, is finished at the start of the collision avoidance support control. Moreover, as illustrated in FIG. 9, even when the start of the regeneration enhancement control is required (that is, even when the target deceleration end position P0* and the target deceleration end vehicle speed V0* are supplied to the support control unit 72) at a time point t2 while the collision avoidance support control is being carried out, the regeneration enhancement control is inhibited from being started from the beginning.

The execution restriction unit 73 may be configured to inhibit the resumption of the predictive deceleration support control routine by the support execution unit 72 at least while the vehicle has not reached the target deceleration end position P0* even when the collision avoidance support control is finished (when the execution inhibition determination switches to the execution permission determination) before the vehicle reaches the target deceleration end position P0*.

With the vehicle control device according to the above-mentioned embodiment, the collision avoidance support control and the regeneration enhancement control are not simultaneously carried out. Therefore, such a state that the regeneration enhancement control is finished during the execution of the collision avoidance support control does not occur, and the deceleration of the vehicle does not thus rapidly decrease when the vehicle passes the target deceleration end position. As a result, the collision avoidance support control can be appropriately carried out. Moreover, the accelerator release guidance is inhibited along with the regeneration enhancement control, and the brake operation by the driver can thus be appropriately prompted. In other words, the prompting for the brake operation by the driver, which is important during the collision avoidance, is not interfered with by the accelerator release.

Moreover, in the predictive deceleration support control, when the accelerator release map is switched from the normal control map to the regeneration enhancement control map, the deceleration characteristic gradually changed, and the driver can thus be prevented from feeling a sense of discomfort.

In the above, the vehicle control device according to this embodiment has been described, but the present invention is not limited to the above-mentioned embodiment and modified example, and various changes are possible within the range not departing from the object of the present invention.

For example, in this embodiment, a description has been given of the application to the hybrid vehicle, but the vehicle control device may be applied to an electric vehicle that does not include an engine, which is a travel driving source.

What is claimed is:

1. A vehicle control device of a vehicle, the vehicle comprising: a regenerative braking device comprising at least a motor generator configured to generate electric power by a wheel rotated by an external force and to recover the generated electric power to an in-vehicle battery, to thereby apply a regenerative braking force to the wheel; a friction braking device comprising at least friction brake mechanisms configured to apply a friction braking force to the wheel through a brake hydraulic pressure; and a sensor configured to detect an object, the vehicle control device comprising:
an electronic control unit configured to:
set, when the vehicle is predicted to decelerate based on position information of the vehicle, a position at which the deceleration is predicted to be finished as a target deceleration end position;
carry out regeneration enhancement control, which is control of using the regenerative braking device to decelerate the vehicle so that electric energy recovered to the in-vehicle battery when an accelerator pedal is released increases during deceleration of the vehicle to which the target deceleration end position is set as compared to deceleration of the vehicle to which the target deceleration end position is not set, and finishing the regeneration enhancement control when the vehicle reaches the target deceleration end position;
detect that the vehicle is in a state in which the vehicle is highly likely to collide with an obstacle based on a detected result of the sensor;
carry out collision avoidance support control of controlling the brake hydraulic pressure when the state in which the vehicle is highly likely to collide with an obstacle is detected, to thereby support avoidance of a collision between the vehicle and the obstacle;
prioritize the collision avoidance support control over the regeneration enhancement control so that the collision avoidance support control and the regeneration enhancement control are not simultaneously carried out;

give a notification for prompting a driver to release the accelerator pedal so that the deceleration of the vehicle finishes at the target deceleration end position when the electronic control unit determines that the regeneration enhancement control should be carried out; and inhibit giving of the notification for prompting the driver to release the accelerator pedal when the collision avoidance support control is being carried out.

2. The vehicle control device according to claim 1, wherein the electronic control unit is further configured to:

inhibit starting of the regeneration enhancement control when the collision avoidance support control is being carried out, and finish the regeneration enhancement control before the collision avoidance support control is started when the state in which the vehicle is highly likely to collide with an obstacle is detected while the regeneration enhancement control is being carried out.

\* \* \* \* \*